Patented Sept. 24, 1940

2,215,737

UNITED STATES PATENT OFFICE 2,215,737

METHOD OF MAKING LEAD ZIRCONIUM SILICATE

Charles J. Kinzie, Niagara Falls, N. Y., assignor to The Titanium Alloy Manufacturing Company, New York, N. Y., a corporation of Maine No Drawing. Original application June 12, 1934, Serial No. 730,265. Divided and this application December 24, 1937, Serial No. 181,704

5 Claims. (Cl. 23—110)

This application is a division of my pending application for patent filed June 12, 1934, Serial No. 730,265, now U. S. Letters Patent No. 2,127,844 of August 23, 1938.

My invention relates more particularly to improved methods of making double silicates of zirconium that I have found to be of great advantage in the manufacture of enamels and glazes, in which such improved double silicates or zirconium are used as opacifiers, as well as in the manufacture of paints and lacquers in which such novel double silicates of zirconium are employed as pigments.

Zircon ($ZrSiO_4$) has useful properties as a constituent of protective coatings, such as vitreous enamels as well as paint and lacquer coatings made with organic vehicles. I have found, however, that $ZrSiO_4$ is rather difficult to reduce to such a degree of fineness as required for pigment purposes, especially for those applications in which the vehicle and pigment are ground together in an iron mill, in which case any residual gritty abrasive particles in the zircon will be likely to wear off enough iron to discolor the paint or other coating.

It is also true that zircon is of a very refractory nature as regards heat and response to chemical action, which tends in ceramics to retard the reactions necessary in order that the zirconium may have its desired effect in combination with other materials employed in forming the ceramic coatings.

I have discovered that by first converting the zircon ($ZrSiO_4$) by heat in a dry way to a double silicate, the compounds formed are free of the objectionable abrasive properties inherent in zircon, and also that the double silicates so formed are less refractory as compared with the $ZrSiO_4$ and then combine more readily with other ceramic materials to produce the desired effects.

In ceramics as well as in the paint industry, lead compounds such as litharge, PbO, minimum $Pb_3O_4$, and white lead (basic lead carbonate), all have useful properties. For instance, in the paint industry the property of a very high specific gravity permits of making paints with a high pigment content while in ceramics the lead compounds are very active fluxes. In either industry there exists, however, the objectionable feature that the lead compounds in present day use are readily soluble in human system, and when taken into the system by breathing paint or ceramic sprays, etc., lead poisoning may result.

By combining the lead with zirconium as basic as well as normal lead zirconium silicate, a paint pigment results having a high specific gravity and low oil absorption. Paints made therefrom can be heavily loaded with pigment and I believe that the lead zirconium combination which is relatively more inert in comparison with lead oxides and carbonates will present considerably less hazard to workers engaged in use and application thereof; in ceramics the useful fluxing action of lead may be combined with the useful properties of zirconium in one compound, while reducing the hazard incidental to use of lead compounds.

The novel double silicate of zirconium compounds are relatively free of the gritty properties of zircon, while at the same time they are crystalline in structure so as to form useful polishing agents. Hence the various altered zircons or double silicates of zirconium present a wide range of properties for the polishing field.

Certain of the compounds, such as for instance lead and barium zirconium silicates, may also be useful as insecticides and fungicides.

The products of my invention are therefore of dual interest in paints and in ceramics and also form useful cements and mild polishing compounds as well as possessing possibilities by way of application along other lines.

In order that the nature of my invention may be understood a series of illustrative examples will be set forth to show how these new products may be obtained by following the various procedures described.

EXAMPLE A.—LEAD ZIRCONIUM SILICATE ($PbZrSiO_5$)

Batch weights 500 parts by weight of $ZrSiO_4$ —325 mesh or 45.09%
608.95 parts by weight of PbO or 54.91%

A charge of these ingredients of such batch is intimately mixed either by wet milling with water to a slip, which is then dried, or by means of an initial rough dry mixing, followed by passing the mix through a disintegrating or fine dry milling mahcine to bring the particles of $ZrSiO_4$ and PbO into intimate contact.

The charge is preferably formed into bricks by dry or damp press method in preparation for heating. The bricks are then heated at about 800° C. to form lead zirconium silicate ($PbZrSiO_5$). In order to prepare the double silicates for use, the product is then milled preferably with water to the desired fineness which is readily done since the compound formed is easily reduced to a fine state of subdivision. The milled product is then dried.

This lead zirconium silicate has approximately the following composition:

| | Per cent |
|---|---|
| Lead (calculated as PbO) | 54.91 |
| Zirconium (calculated as $ZrO_2$) | 30.31 |
| Silica (calculated as $SiO_2$) | 14.78 |
| | 100.00 |

Crystals of this product are lathshaped with extinction inclined to the long axis at 30° to 32°, with indistinct cleavage.

The index of refraction of these crystals is a little below 1.85 with birefringence of about .002.

The crystals however are too fine to determine other optical properties. The particles vary in size from less than 0.5 micron to about 60 microns with the average approximately 5 to 7 microns.

This new product may consist of a mixture of zirconium oxide crystals, a glassy matrix and a moderate amount of $Pb_2SiO_4$ along with the third crystalline material lead zirconium silicate. The zirconium oxide can be either free or dispersed in the $Pb_2SiO_4$, or may be dispersed in the lead zirconium silicate crystals. There should be no free lead or free zircon remaining in this product. The color of finished product which is a normal double silicate will vary with amount of impurities present, but usually is either cream or ivory color.

EXAMPLE B.—BASIC LEAD ZIRCONIUM SILICATE

By basic, we mean a silicate that contains less of PbO than is required to form the normal double silicate. When a basic double silicate is made, it will contain some of the normal double silicate, possibly some glass with $ZrO_2$ dispersed either in the glass or in normal double silicate, or even in a third silicate that would form with PbO and $SiO_2$, and will contain more free zircon as the percentages of these oxides decrease. In the formation of the basic double silicate, products are made that are more suited for certain uses than the normal double silicates.

*Batch weights*

500 parts by weight of $ZrSiO_4$ —325 mesh or 75%
166 parts by weight of PbO or 25%

The method of mixing, preparation for heating, temperature of formation, and final preparation are same as described in Example A.

The product made in this Example B has approximately the following composition:

| | Per cent |
|---|---|
| Lead (calculated as PbO) | 25 |
| Zirconium (calculated as $ZrO_2$) | 50 |
| Silica (calculated as $SiO_2$) | 25 |
| | 100 |

This product contains all the constituent minerals or crystals that the normal lead zirconium silicate contains plus an excess of zircon with about the same amount of $Pb_2SiO_4$ and less $ZrO_2$.

The index of refraction of these crystals is about 1.90. Particles vary in size from less than 0.5 micron to about 60 microns with the average approximately 5 to 7 microns. Particle sizes may vary because they depend largely on milling. This Example B product is considerably lighter in color when contrasted with that of Example A. Although the microscope identifies some free $ZrSiO_4$, this has apparently been so altered probably at the surface that the product as a whole is free of the grittiness and harshness of finely milled zircon from which it was made.

Similarly products can be made with less PbO and with more PbO than is set forth in this example, for instance, PbO 10%, $ZrO_2$ 60% and $SiO_2$ 30%. Generally I prefer the products containing less lead than in Example A, and the lead may be varied from about 55% PbO to 10% PbO; of course more or less could be used if such products were desired.

In the foregoing examples the $ZrSiO_4$ has been a pure product containing but small amounts of impurities so that light-colored products may result. However, it would be entirely within the scope of my invention to use a $ZrSiO_4$ containing appreciable amounts of commingled impurities such as monazite, rutile, ilmenite, etc., provided the resultant discoloration will not be objectional for the uses intended.

I could use zirconium ores such as one containing about

| | Per cent |
|---|---|
| $ZrO_2$ | 50 |
| $ZrSiO_4$ | 40 |
| Impurities such as free silica, clay, $TiO_2$, $Fe_2O_3$, etc | 10 |

The double silicates and basic silicates may, of course, be made by intimately mixing and dry reacting of the separate oxides, $ZrO_2$, $SiO_2$ with the flux to yield similar products, but this is of only theoretical interest as $ZrSiO_4$ is much the lower priced material.

In the calculated composition of various products no account has been taken of small amounts impurities in the $ZrSiO_4$ or in the various fluxing compounds.

The zircon used was refined zircon containing approximately

| | Per cent |
|---|---|
| $ZrO_2$ | 65.00 |
| $SiO_2$ | 34.00 |
| $TiO_2$ | 0.10 |
| $Fe_2O_3$ | 0.10 |
| Others $Al_2O_3$ | 0.80 |
| | 100.00 |

In some instances it may be desirable to wash the milled product with water before drying to remove small amounts water-soluble salts.

Basic lead zirconium silicate is of a decided yellowish tone and normal lead zirconium silicate is quite yellow.

Mention has been made of pressing mixture into bricks prior to heating. This allows of stacking charge in a kiln leaving space between bricks to permit heat to penetrate. Reactions have been made by heating loose material in crucibles and on open hearths with stirring, the reactions appear to proceed more rapidly when charge is compacted. The charge could be extruded damp into rods of suitable size and heated or can be shaped otherwise. The charges are dry-reacted and not fused.

I have found that the compounds of the metals which will effectively react with the zirconium silicate are the bi-valent oxides and carbonates of lead, zinc and the alkaline earth-metals. The amounts of these compounds of the metals used as reagents in the charge vary from that required to combine theoretically with the zircon to form the normal double silicate of zirconium with the metal used, down to amounts as shown in the "basic" Example B to form a complex consisting of the normal silicate, zirconium oxide and some residual zircon together with other substances that can not be identified with certainty. The resulting product as a basic double silicate consists of a mixture or complex and is not a definite chemical compound. The temperatures employed in these examples are sufficiently high to secure a substantially complete reaction of the ingredients of the charge in which the zircon is decomposed, but without fusion of such ingredients, and the products are in the form of finely-divided pigment particles.

I claim as my invention:

1. The method of making a double silicate of zirconium which consists in heating a charge composed of finely-milled zirconium silicate and lead oxide at about 800° C. and below fusion of the ingredients of the charge but sufficiently high to secure a substantially complete reaction and decomposition of the zirconium silicate and lead oxide to form a lead zirconium silicate.

2. The method of making a double silicate of zirconium which consists in heating a charge composed of finely-milled zirconium silicate and lead oxide at temperatures below fusion of the ingredients of the charge but sufficiently high to secure a substantially complete reaction and decomposition of the zirconium silicate to form a normal lead zirconium silicate ($PbZrSiO_5$).

3. The method of making a double silicate of zirconium which consists in heating a charge composed of finely-milled zirconium silicate and lead oxide at about 800° C. to secure a substantially complete reaction and decomposition of the zirconium silicate to form a normal lead zirconium silicate ($PbZrSiO_5$).

4. The method of making a double silicate of zirconium which consists in heating a charge composed of finely-milled zirconium silicate and lead oxide in an amount less than that required to theoretically combine with the zirconium silicate to form the normal double silicate at a temperature sufficient to secure a reaction of the ingredients of the charge but without fusion thereof to form a complex consisting of a mixture of the normal lead zirconium silicate, zirconium oxide and residual zirconium silicate.

5. The method of making a double silicate of zirconium which consists in heating a charge composed of finely-milled zirconium silicate and lead oxide in an amount less than that required to theoretically combine with the zirconium silicate to form the normal double silicate at about 800° C. to secure a reaction of the ingredients of the charge but without fusion thereof to form a complex consisting of a mixture of the normal lead zirconium silicate, zirconium oxide and residual zirconium silicate.

CHARLES J. KINZIE.